UNITED STATES PATENT OFFICE.

HIRAM S. UTLEY, OF AUSTIN, ILLINOIS, ASSIGNOR, BY MESNE ASSIGNMENTS, TO THE NATIONAL MARBLE COMPANY, OF CHICAGO, ILLINOIS.

COMPOUND FOR MAKING ARTIFICIAL STONE.

SPECIFICATION forming part of Letters Patent No. 620,383, dated February 28, 1899.

Application filed March 12, 1898. Serial No. 673,580. (No specimens.)

*To all whom it may concern:*

Be it known that I, HIRAM S. UTLEY, a citizen of the United States, residing at Austin, in the county of Cook and State of Illinois, have invented certain new and useful Improvements in Compounds for Making Artificial Stone, Marble, Tile, &c., of which the following is a full, clear, and exact description.

This invention relates to improvements in compounds for making artificial stone, marble, tile, &c., as well as plastering for walls and pillars and for other ornamental work, and has for its object to provide a new and useful composition of matter which when properly treated shall possess the desirable qualities of hardness and susceptibility of high polish, as well as adaptability for formation of ornamental designs, in the maximum degree.

In carrying out my invention I employ plaster-of-paris, ammonia, glycerin, alum, and glue-water, prepared and mixed in substantially the proportions and manner as follows, to wit: First, take one pound of glue to three gallons of cold water and allow the glue to soak about twelve hours and then gradually come to a boil, permitting the solution to boil for about fifteen minutes. Then make a solution of equal parts of glycerin and a saturated solution of alum, thoroughly mixed together. Next take seventy parts of the glue-water to one part of the solution of glycerin and alum, mix the same together, and let the whole solution boil for about ten minutes. Then add plaster-of-paris to the boiled solution, mixing in a sufficient quantity to make the whole a plastic body. When the mass becomes cooled, but before it is set, add a saturated solution of ammonia or full-strength aqua-ammonia, in quantity equal to one-half part of the alum and glycerin solution, mixing the same thoroughly into the mass.

The above compound, when allowed to set and harden, produces a stone equal in strength and hardness to the natural marble and capable of taking a much higher and more durable polish than natural marble and will also withstand a very much greater degree of heat than any natural marble.

The glycerin in the compound prevents the stone from checking in drying. The ammonia prevents the compound, after setting and drying, from absorbing water or moisture, thereby avoiding softening or "sloughing off" of the compound, especially when applied to walls, pillars, &c., and the alum promotes the hardness of the stone when set.

This compound may be molded or formed in any way into ornamental shapes and allowed to set and harden for use—as slabs, tiles, moldings, &c.—or the compound, when in a plastic state, may be used as a covering or coating for walls, pillars, floors, and other places, or wherever ornamental or polished stone or marble facing is desired.

Suitable coloring-matter—such as pigment, water-colors, or any vegetable dyes or colorings—may be added to the compound, so as to imitate various kinds of marbles or for making ornamental stone or marble in contrasting colors, or different coloring-matters may be added to different patches of the compound, and then the different-colored compound may be mixed together to form imitation stone or marble for any desirable use.

This stone may be polished by any of the well-known methods now commonly used in polishing artificial stone and marble.

I have also found that by the addition to the ingredients before referred to of air-slaked lime and chlorid of sodium in the proper proportions the compound is greatly improved for certain kinds of work. For instance, if to the compound before referred to there be added one part of air-slaked lime and one-sixteenth part of chlorid of sodium or common salt the setting of the compound will be retarded and the compound when set and hardened will be susceptible of a higher polish, this result being due to the addition of the lime and salt.

The use of the lime to retard the setting of the compound is particularly advantageous when the compound is used as a plaster to be either applied to walls or to be used in the making or covering of ornamental surfaces, as it greatly facilitates the working of the compound in the desired shapes, and when the lime is added the chlorid of sodium has the effect of rendering the compound susceptible of a higher polish.

It will of course be understood that the proportions of all of the materials mentioned herein may be varied from those given; but in the practical work which I have done with this compound I have found these proportions give generally satisfactory results, although I have found it necessary myself to vary these proportions according to the work to be done.

Having thus fully described my invention, what I claim, and desire to secure by Letters Patent, is—

A compound for producing artificial stone, marble, &c., consisting of glue-water, ammonia, glycerin, alum and plaster-of-paris, substantially as described.

HIRAM S. UTLEY.

Witnesses:
W. R. OMOHUNDRO,
T. N. RAYMOND.